United States Patent
Goldspink et al.

(10) Patent No.: US 8,880,710 B2
(45) Date of Patent: *Nov. 4, 2014

(54) WEBSITE MONITORING AND COOKIE SETTING

(75) Inventors: Lincoln M V Goldspink, Southampton (GB); Malcolm J Duckett, Medstead (GB)

(73) Assignee: Speed-Trap.Com Ltd., Berkshire (GB)

( * ) Notice: Subject to any disclaimer, the term of this patent is extended or adjusted under 35 U.S.C. 154(b) by 687 days.

This patent is subject to a terminal disclaimer.

(21) Appl. No.: 12/162,690

(22) PCT Filed: Jan. 29, 2007

(86) PCT No.: PCT/GB2007/000290

§ 371 (c)(1),
(2), (4) Date: Jul. 30, 2008

(87) PCT Pub. No.: WO2007/088334

PCT Pub. Date: Aug. 9, 2007

(65) Prior Publication Data

US 2009/0024748 A1    Jan. 22, 2009

(51) Int. Cl.
*G06F 15/16*    (2006.01)
*G06F 17/30*    (2006.01)

(52) U.S. Cl.
CPC ................................. *G06F 17/3089* (2013.01)
USPC ........................... 709/228; 709/227; 709/229

(58) Field of Classification Search
USPC ....................................................... 709/228
See application file for complete search history.

(56) References Cited

U.S. PATENT DOCUMENTS

| | | | | |
|---|---|---|---|---|
| 6,073,241 | A * | 6/2000 | Rosenberg et al. | 726/3 |
| 6,098,093 | A * | 8/2000 | Bayeh et al. | 709/203 |
| 6,510,439 | B1 | 1/2003 | Rangarajan et al. | |
| 6,598,077 | B2 * | 7/2003 | Primak et al. | 709/219 |
| 6,947,992 | B1 * | 9/2005 | Shachor | 709/228 |
| 7,188,181 | B1 * | 3/2007 | Squier et al. | 709/228 |
| 7,194,764 | B2 | 3/2007 | Martherus et al. | |
| 7,373,524 | B2 * | 5/2008 | Motsinger et al. | 713/194 |
| 2001/0039586 | A1 * | 11/2001 | Primak et al. | 709/228 |
| 2002/0007317 | A1 * | 1/2002 | Callaghan et al. | 705/26 |

(Continued)

FOREIGN PATENT DOCUMENTS

| GB | 2 383 505 | 6/2003 |
|---|---|---|
| WO | 97/26729 | 7/1997 |

(Continued)

OTHER PUBLICATIONS

International Search Report for PCT/GB2007/000290, mailed May 15, 2007.

(Continued)

*Primary Examiner* — Umar Cheema
(74) *Attorney, Agent, or Firm* — Nixon & Vanderhye PC

(57) ABSTRACT

A method and apparatus for setting cookies on client devices 6, in particular for allowing maintenance of cross domain session continuity. A server 5 is provided for extracting a session ID from a first party cookie in the domain of the server 5 which is included in a HTTP request generated by a page 8 from a different domain active in a browser 7. Code is returned by the server 5 to that page 8 to cause it to generate a first party cookie in its domain which includes the extracted session ID.

23 Claims, 3 Drawing Sheets

(56) References Cited

U.S. PATENT DOCUMENTS

| | | | |
|---|---|---|---|
| 2002/0112155 | A1 | 8/2002 | Martherus et al. |
| 2002/0133534 | A1* | 9/2002 | Forslow ........................ 709/200 |
| 2003/0023880 | A1* | 1/2003 | Edwards et al. ............. 713/201 |
| 2003/0187871 | A1* | 10/2003 | Amano et al. ................ 707/102 |
| 2003/0191970 | A1* | 10/2003 | Devine et al. ................ 713/201 |
| 2004/0015580 | A1* | 1/2004 | Lu et al. ........................ 709/224 |
| 2004/0054784 | A1 | 3/2004 | Busch et al. |
| 2004/0088363 | A1 | 5/2004 | Doemling et al. |
| 2005/0198099 | A1* | 9/2005 | Motsinger et al. ............ 709/200 |
| 2006/0265495 | A1* | 11/2006 | Butler et al. .................. 709/224 |
| 2006/0277596 | A1* | 12/2006 | Calvert et al. ..................... 726/3 |
| 2008/0027824 | A1* | 1/2008 | Callaghan et al. ............. 705/26 |

FOREIGN PATENT DOCUMENTS

| | | |
|---|---|---|
| WO | 00/75827 | 12/2000 |
| WO | 00/75827 A1 | 12/2000 |
| WO | 01/35259 A2 | 5/2001 |
| WO | 01/69386 | 9/2001 |
| WO | 01/89170 | 11/2001 |
| WO | 02/48899 | 6/2002 |

OTHER PUBLICATIONS

Written Opinion of the International Searching Authority for PCT/GB2007/000290, mailed May 15, 2007.

European Search Report for Great Britain Application No. 114319, dated Nov. 15, 2006.

Berry, W., "15 Seconds: Sharing Cookies Across Domains" Internet Citation, pp. 1-4, (Aug. 11, 1997).

Kings-Lynne, C., "Implementing Cross-Domain Cookies", PHP Builder Articles [Online], pp. 1-3, (Nov. 29, 2000).

Endler, D., "The Evolution of Cross-Site Scripting Attacks", IDEFENSE White Paper [Online], pp. 1-25, (May 20, 2002).

Zimmer, D., "Real World XSS", Net-Security Articles [Online], pp. 1-12, (Apr. 11, 2003).

Pouttu-Clarke, M. et al., "Cross Domain Cookie Provider", Internet Citation, pp. 1-5, (Jan. 19, 2005).

Cisco System Inc.: Web Step Descriptions, Cisco Customer Response Applications Developper'S Guide [Online], pp. 11-1-11-12, (2001).

"What are Cookies?", The U.S. Department of Energy, Computer Incident Advisory Capability, Internet Citation, [Online], pp. 1-9, (Mar. 12, 1998).

Yee, K P., "A Survey of Cookie Management Functionality and Usability in Web Browsers", Internet Publication, [Online], pp. 1-11, (2002).

Cingil I. et al., "A Broader Approach to Personalization" Communications of the Association for Computing Machinery, ACM, vol. 43, No. 8, pp. 135-141, (Aug. 2000).

Cingil, I., "Supporting Global User Profiles Through Trusted Authorities", SIGMOD Record, ACM, vol. 31, No. 1, pp. 11-17, (Mar. 2002).

Zumstein, P. et al., "Microsoft Internet Explorer Flaw in OBJECT Domain Security Enforcement Lets Remote Users Execute Code in Arbitrary Domains", securitytracker.com, [Online], 3 pages, (Jul. 11, 2002).

International Search Report and Written Opinion re PCT/GB2007/000283 mailed May 15, 2007.

European Search Report re GB Application No. 114319 dated Nov. 15, 2006.

Doyle M., "JavaScript and Cookies," Web Development > JavaScript, Oct. 31, 2002, pp. 1-7, Retrieved from the Internet on Sep. 19, 2001 @ http://www.elated.com/articles/javascript-and-cookies.

Pouttu-Clarke M. et al., "Cross Domain Cookie Provider," Internet Citation, Jan. 19, 2005, XP002405757, Retrieved from the Internet on Nov. 6, 2006 @ http://www.theserverside.com/patterns/thread.tss?thread_id=31258.

* cited by examiner

WEBSITE MONITORING AND COOKIE SETTING

RELATED APPLICATIONS

This application is the U.S. national phase of International Application No. PCT/GB2007/000290, filed 29 Jan. 2007, which designated the U.S. and claims priority to Great Britain Application No. 0601939.2, filed 31 Jan. 2006, and claims benefit of U.S. Provisional Application No. 60/772,409, filed 10 Feb. 2006, the entire contents of each of which are hereby incorporated by reference. This application is also related to copending, commonly assigned application Ser. No. 12/162,666, which was also filed 30 Jul. 2008, naming the same co-inventors and also entitled: WEBSITE MONITORING AND COOKIE SETTING.

BACKGROUND

1. Technical Field

This invention relates to website monitoring and the setting of cookies on client devices.

The invention as it relates to the setting of cookies on client devices is of use in website monitoring, but can also have other uses.

2. Related Art

Website monitoring or web analytics in itself is now fairly commonplace. Website monitoring/website analytics is used to monitor the performance and use of an organisation's website to help understand problems and ultimately improve the effectiveness of the site by improving "metrics" such as conversion rates and user experience, or preventing or detecting undesirable behaviour such as fraud.

What is now generally considered to be the method of choice for such monitoring is a technique which may be described as involving "client side page tagging". These techniques in themselves are well understood and one such technique has been used for some time by the Applicants. An early version of this technique is explained in detail in the Applicants' earlier applications WO01/69412 and WO01/69386. In such techniques, it is now typical to put some script (for example JavaScript or Visual Basic Script) within a selection or each and every page of a website. As each page is visited, this script causes there to be communication with a server responsible for the collection of events describing users' journeys/interactions with the website and managing any necessary interaction with the client.

This approach however means that scripts running in one page during a visitor's use of a monitored site will have no way of communicating with scripts running in previous or subsequent pages viewed during the visit. This necessitates a mechanism that can link the data from such a sequence of pages into one "session". The maintenance of this "session continuity" has been commonly achieved via the use of cookies, where the cookie is used to store a session ID. Cookies are only accessible within the domain in which they are set.

Here and throughout the specification, the expression "domain" is used in the sense used in relation to the Internet and "domain names". Thus, a domain is defined by an Internet address xxx.com or xxx.co.uk and so on—i.e. by a top level domain name.

Cookies can be set or read by scripts running in the client browser, or by a web server communicating with the client.

Two types of cookies exist, these being first and third party cookies.

First party cookies are cookies that have been set within the domain of the page being viewed. This can be achieved by using either scripts executing within the page or by the web server(s) that are in the domain of the current page through the use of HTTP "set cookie" headers. f Third party cookies are those that are set through the use of the HTTP "set cookie" headers by web server(s) that are not in the domain of the current page (these are third party web servers).

Script executing in the current page cannot read or set third party cookies. Any web server communicating with a client will only be sent cookies currently known to the browser that are within the web server's domain. This behaviour is part of the browser security model.

Hence third or first party cookies can be used to maintain session continuity. However, only third party cookies are able to maintain session continuity between domains. Due to security concerns, third party cookies are typically blocked by modern clients. This means that cross domain session tracking using third party cookies is ineffective.

Without third party cookies therefore, accurate cross domain session tracking has been impossible. Whilst there are circumstances where the use of third party cookies may be illegitimate or undesirable there can be circumstances where maintaining session continuity across domains is legitimate and desirable.

There are situations where this may be useful to the user and/or to an organisation which maintains websites in several different domains.

It is fairly typical for large organisations to maintain a number of websites which reside in different domains. There may, for example, be a different website for different areas of the business or a different website for each country (e.g. a .com site, a .co.uk site and so on). Thus, there may be a single enterprise with websites in different domains and the current technologies as outlined above are incapable in practical terms of allowing website monitoring across these different websites as they are visited by a user. Thus, for example, session continuity might be lost just as the user is moving to a point where he is about to make a purchase or a booking if that part of the operation is handled by a website running within a different domain.

Thus, an enterprise can be left in a situation where it has monitoring information in respect of each of its websites and could well know that many of these individual "partial sessions" in respect of the separate websites will actually relate to a single user and a single browser instance navigating across their various websites, but yet be unable to follow the whole interaction.

Brute force methods for trying to re-connect such partial sessions to give the overall picture are in reality complex, costly and unreliable. Such techniques generally only provide a best guess as to which partial sessions snap together.

Other methods exist to maintain session context across domains. Many of these are geared towards providing a single log-in across multiple domains. These typically use a series of requests and redirects to achieve the desired results. Such techniques are complex to implement and maintain.

Other possible solutions may use a customer database to maintain context. However, this approach causes problems because the customer ID will not necessarily be known at the start of a session and therefore initial phases of a visit cannot be related to later phases on other domains.

BRIEF SUMMARY

The Applicants had an objective to alleviate this problem in maintaining session context particularly in the field of website monitoring, but it is considered that the resulting invention can have a broader application than this.

According to a first aspect of the present invention there is provided a method for setting a cookie on a client device comprising the steps of:

receiving at a server, an http message from an active page within a browser running on the client device;

extracting data from a cookie present in the header of the http message; determining data which is to be included in a cookie resident on the client device in dependence on the data extracted from the cookie present in the header of the http message; and sending a message to the active page including an instruction to generate a cookie within the browser including the data determined in the determining step.

The active page may be supplied to the client device from a page server.

The server may be separate from but in the same domain as a page server.

Typically the cookie is a first party cookie. The cookie may be a session cookie or a permanent cookie.

The step of extracting data from the cookie present in the header of the http message may comprise the step of extracting a session ID from the cookie. The message sent to the active page may include an instruction to generate a cookie including a session ID determined in dependence on the extracted session ID. The instruction may be an instruction to generate a cookie including a session ID that is the same as the extracted session ID.

The method may comprise the further step of receiving farther messages from the same page and/or another page within the browser that include data derived from the generated cookie. The further messages may include a session ID derived from the generated cookie. The data derived from the generated cookie may comprise the generated cookie itself.

The method may comprise the further step of the server receiving a plurality messages and determining whether the messages are from the same browser session in dependence on the data, derived from the generated cookie, present in each message.

The method may comprise the farther step of the server receiving a plurality messages and determining whether the messages are from the same browser session in dependence on the session IDs present in each message.

There may be a collection server for collecting monitoring information concerning website interactions and/or performance. The method may comprise the step of receiving, from the browser running on the client device, monitoring information concerning webpage interactions and/or performance. The collection server may be separate from said server. Preferably, the server comprises a collection server for collecting monitoring information concerning webpage interactions and/or performance. Where the generated cookie includes a session ID which is based on the data extracted from the cookie present in the header of the http message, this can help to tie together monitoring information from a session where a number of different websites in different domains are visited.

Where, as is typical, first party cookies are used, provided that the "landing page" —i.e. first page in a chain—is in the same domain as the collection server, cross domain monitoring can still be achieved while at least one page of each domain visited is constructed to generate an http message to the server and generate an appropriate cookie including a session ID in response to receipt of an instruction to do so by the server. It will be appreciated that the log of monitoring information will start the first time a browser session loads a page from the appropriate domain where that page includes the relevant structure to send an http message to the server—it is irrelevant whether or not other pages have been loaded previously. Similarly, if in one session the user starts in the domain of the server, but then navigates to sites that are not covered by the system or to pages in covered sites that do not contain the appropriate script, no monitoring information will be gathered from these pages/sites, but as soon as an appropriately set up page is loaded, monitoring can continue.

The message from the active page may comprise a request for a page component. The message from the active page may comprise an http request.

The message to the active page may comprise a portion of script, for example JavaScript or Visual Basic Script. The portion of script may be arranged to execute within the page to generate the cookie including the data determined in the determining step.

In general terms in this specification the client device may be any device capable of supporting a browser. In general terms in this specification a browser may be any module capable of allowing the browsing of pages that can generate and receive messages, in particular which can send messages including http headers. As will be clear, in one example, the client device may comprise a PC running conventional browser software such as MS Internet Explorer (®), but in other examples the client device might be a mobile telephone or other such device and may include an embedded browser.

According to a second aspect of the present invention there is provided apparatus for causing setting of a cookie on a client device, the apparatus comprising a server arranged under the control of software to:

receive an http message from an active page within a browser running on the client device;

extract data from a cookie present in the header of the http message;

determine data which is to be included in a cookie resident on the client device in dependence on the data extracted from the cookie present in the header of the http message; and send a message to the active page including an instruction to generate a cookie within the browser including the data determined in the determining step.

According to a third aspect of the present invention there is provided apparatus for causing setting of a cookie on a client device, the apparatus comprising a server having:

a receive module for receiving an http message from an active page within a browser running on the client device;

an extract module for extracting data from a cookie present in the header of the http message;

a determination module for determining data which is to be included in a cookie resident on the client device in dependence on the data extracted from the cookie present in the header of the http message; and a send module for sending a message to the active page including an instruction to generate a cookie within the browser including the data determined in the determining step.

According to a fourth aspect of the present invention there is provided a website monitoring method comprising the steps of:

receiving at a server, an http message from an active page within a browser running on a client device;

extracting data from a cookie present in the header of the http message;

determining data which is to be included in a cookie resident on the client device in dependence on the data extracted from the cookie present in the header of the http message;

sending a message to the active page including an instruction to generate a cookie within the browser including the data determined in the determining step; and receiving at one of the server and a separate collection server, from the browser running on the client device, messages including data derived from the generated cookie and information concerning at least one of: interactions with and performance of at least one page browsed within the browser running on the client device.

According to a fifth aspect of the present invention there is provided a website monitoring system comprising:

a) a server arranged under the control of software to:

receive an http message from an active page within a browser running on a client device;

extract data from a cookie present in the header of the http message;

determine data which is to be included in a cookie resident on the client device in dependence on the data extracted from the cookie present in the header of the http message; and send a message to the active page including an instruction to generate a cookie within the browser including the data determined in the determining step; and b) a collection server arranged under the control of software to: receive, from the browser running on the client device, messages including data derived from the generated cookie and information concerning at least one of:

interactions with and performance of at least one page browsed within the browser running on the client device; and determine whether received messages are from the same browser session in dependence on the data derived from the generated cookie present in each message.

According to a sixth aspect of the present invention there is provided a website monitoring system comprising:

a) a server comprising:

a receive module for receiving an http message from an active page within a browser running on a client device;

an extract module for extracting data from a cookie present in the header of the http message;

a determination module for determining data which is to be included in a cookie resident on the client device in dependence on the data extracted from the cookie present in the header of the http message; and a send module for sending a message to the active page including an instruction to generate a cookie within the browser including the data determined in the determining step; and b) a collection server comprising:

a receive module for receiving, from the browser running on the client device, messages including data derived from the generated cookie and information concerning at least one of: interactions with and performance of at least one page browsed within the browser running on the client device; and a determination module for determining whether received messages are from the same browser session in dependence on the data derived from the generated cookie present in each message.

Said server defined in a) may comprise the collection sever defined in b).

According to a seventh aspect of the present invention there is provided a method for setting a cookie on a client device comprising the steps of:

sending from an active page within a browser running on the client device, to a server, an http message, having a header including a cookie;

receiving a message in the active page from the server, the message including an instruction to generate a cookie within the browser including data determined by the server in dependence on data extracted from the cookie in the header of the http message sent to the server; and generating within the browser running on the client device a cookie in response to the received instruction.

According to a eighth aspect of the present invention there is provided a client device arranged under the control of software to:

send from an active page within a browser running on the client device, to a server, an http message, having a header including a cookie;

receive a message in the active page from the server, the message including an instruction to generate a cookie within the browser including data determined by the server in dependence on data extracted from the cookie in the header of the http message sent to the server; and generate within the browser running on the client device a cookie in response to the received instruction.

In general terms each of the optional features defined above in relation to the first aspect of the invention are equally applicable to the other above aspects invention, with the necessary changes in wording and where context allows. Thus, it will be understood that the apparatus, systems, and computers defined above may be arranged under the control of software to carry out the optional steps defined above. Similarly they may comprise modules for carrying out the appropriate actions. Moreover, where a step is carried out by the server there will often be a corresponding step carried out by the client and clearly therefore the method operated by the client can include such steps and the client can be arranged/have modules to carry those steps out.

These optional features are not restated multiple times purely in the interests of brevity.

In a development of each aspect of the invention a set of servers may be provided each arranged to follow a method as defined above and each residing in a respective different domain. The step of determining which data is to be included in a cookie resident on the client device as carried out by each server may include the step of determining whether one of the servers in the set has already issued a message to that client device.

The method may comprise the step of providing a set of servers, each server provided in a respective different domain and each arranged for operating the above method. The method may comprise the further step of sending from at least one of the servers to at least one other device information concerning data extracted from cookies present in the headers of http messages by that server and/or information concerning data which is determined should be included in cookies resident on client devices by that server. The method may comprise the steps of the server receiving information from another device and using that information in the step of determining data which is to be included in a cookie resident on the client device. Said other device may comprise another server in the set, or a device in communication with another server in the set.

The apparatus may comprise a set of servers each server provided in a respective different domain and each arranged as defined above. The servers may be connected to one another and/or to a common location to allow flow of information concerning data extracted from cookies present in the headers of http messages in each server and/or information concerning the data which is determined should be included in cookies resident on client devices in each server.

In such a way it can be possible to retain session context as a user navigates to websites across a set of domains (that corresponds to the set of servers), irrespective of the starting point (within that set of domains) of the navigation session.

The monitoring method and system can, of course, involve the use of a set of servers so that monitoring may be conducted across the set of domains irrespective of the starting point of the session. There may be a corresponding set of collection servers, for example, each of said servers may also act as a collection server. There may be a different number of collection servers to the number of servers. There may be a common, in some instances single, collection server. Information to preserve session context may flow to a common collection server or among pluralities of collection servers.

According to a ninth aspect of the present invention there is provided a computer program comprising code portions which when loaded and run on a computer cause the computer to carry out any one of the methods defined above.

According to a tenth aspect of the present invention there is provided a computer program comprising code portions which when loaded and run on a computer cause the computer to comprise any one of the apparatus defined above.

According to a eleventh aspect of the present invention there is provided a computer program product comprising a machine readable data carrier carrying a program according to the above aspect of the invention.

BRIEF DESCRIPTION OF THE DRAWINGS

Embodiments of the present invention will now be described by way of example only with reference to the accompanying drawings in which.

DETAILED DESCRIPTION OF EXEMPLARY EMBODIMENTS

Figure 1:
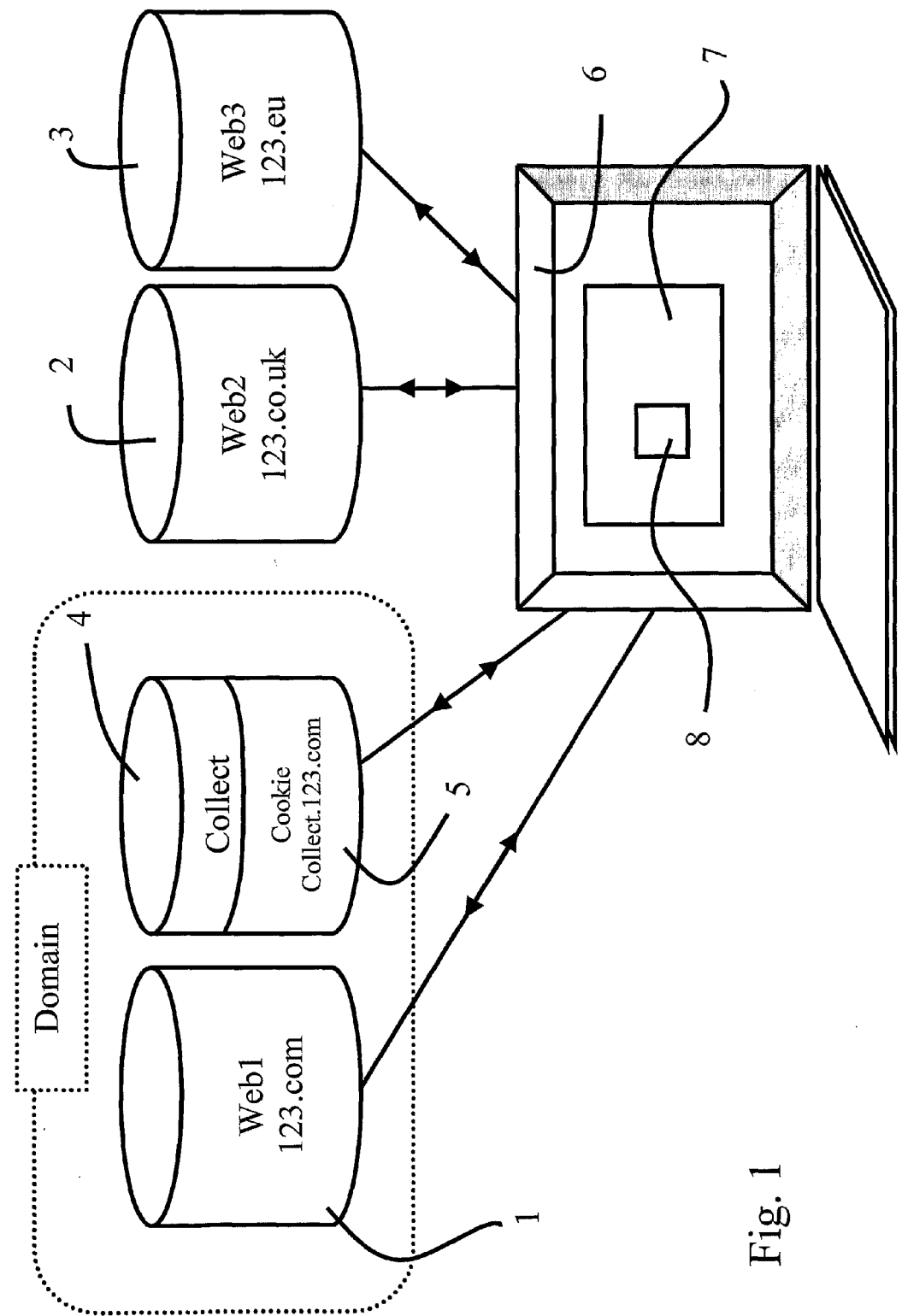
FIG. 1 schematically shows architecture that may be used in a website monitoring system.

FIG. 1 schematically shows architecture that may be used in a website monitoring system which uses client side page tagging to generate and collect a series of events describing a user's journey/interactions with a number of websites.

The architecture comprises a first web server 1 in the domain 123.com, a second web server 2 in the domain 123.co.uk and a third web server 3 in the domain 123.eu. There is also a collection server 4 located in the same domain as the first web server, i.e. in the 123.com domain. In this embodiment, the collection server 4 also comprises a cookie control server 5 which in other embodiments might be separate from the collection server 4. A client device 6 running a browser 7 is connectable to each of the web servers 1,2,3 and the collection server 4 via a network for example via the internet. In this embodiment the client device 6 comprises a conventional PC with conventional components allowing the browser 7 to be run on the computer 6 and allowing the browser 7 to receive web pages from the web servers 1,2,3 (via the use of HTTP messages) and to send and receive http messages to and from the collection server 4.

A user may use the client device 6 to browse web pages supplied from the web servers 1,2,3, but also may, of course, browse to any other web pages which he or she chooses. In the present example, the three web servers, 1,2,3 all belong to the same enterprise, but yet are in different domains. In particular the first web server 1 is in the 123.com domain whereas the second web server 2 is in the 123.co.uk domain and the third web server 3 is in the 123.eu domain.

In the current example we are interested in being able to monitor the web site performance of web sites hosted by each of these three servers 1,2,3 and in particular this is to be done by collecting, at the collection server 4, information concerning the user's interactions with web sites hosted on each of the web servers 1,2,3 when using the client device 6. Moreover, the present invention is directed at allowing the user's interactions with websites from each of the web servers 1,2,3 to be associated together and treated as a single session for the purposes of analysing the monitoring information.

The actual techniques used for monitoring the user's interactions with each of the websites and collecting this information at the collection server as well as for analysing this information and so on are not of particular interest in the present specification. There are a number of conventional techniques which may be used in that part of the process.

What is of interest in the present specification, is the process used for tying together information collected by the collection server 4 concerning the user's interactions with websites hosted on the different web servers 1,2,3 and therefore located in different domains.

In this embodiment use is made of first party cookies to retain session continuity; that is to say to allow interactions with websites on each of the web servers 1,2,3 to be associated with one another.

It will be appreciated that the mention of three different web servers and three different web sites is completely arbitrary and the present technique can work with practically any number of suitably set up web sites. Similarly, of course, there may be almost any number of users interacting with the monitored sites using respective client devices 6.

When the user is browsing web sites using the client device 6, he may visit any number of web sites in any order, but we are interested in the mechanisms which can occur once the user has visited a website provided from the first web server 1. This is because this first web server 1 is in the same domain as the collection server, or more particularly in the same domain as the cookie control server 5 and this allows the present technique to function using first party cookies. After the user has visited a page from the first web server 1, the situation is such that the mechanism explained below can function as the user visits appropriately set up web pages from different web sites.

If the user visits web pages which are not appropriately set up, then monitoring of interactions with those web pages will not be carried out. However, as and when the user browses to a page which is appropriately set up, monitoring can be recommenced and associated with the monitoring which took place earlier provided it is still within the same browser session. This limitation to the interactions only being tied up if taking place within the same browser session comes about because the present embodiment makes use of first party session cookies. In a currently less preferred embodiment, it would be possible to implement the same system whilst making use of first party permanent cookies and in such a case it would be possible to tie up interactions whether or not they came from the same browser session, provided they came from the same browser and the permanent cookie was in place.

Figure 2:
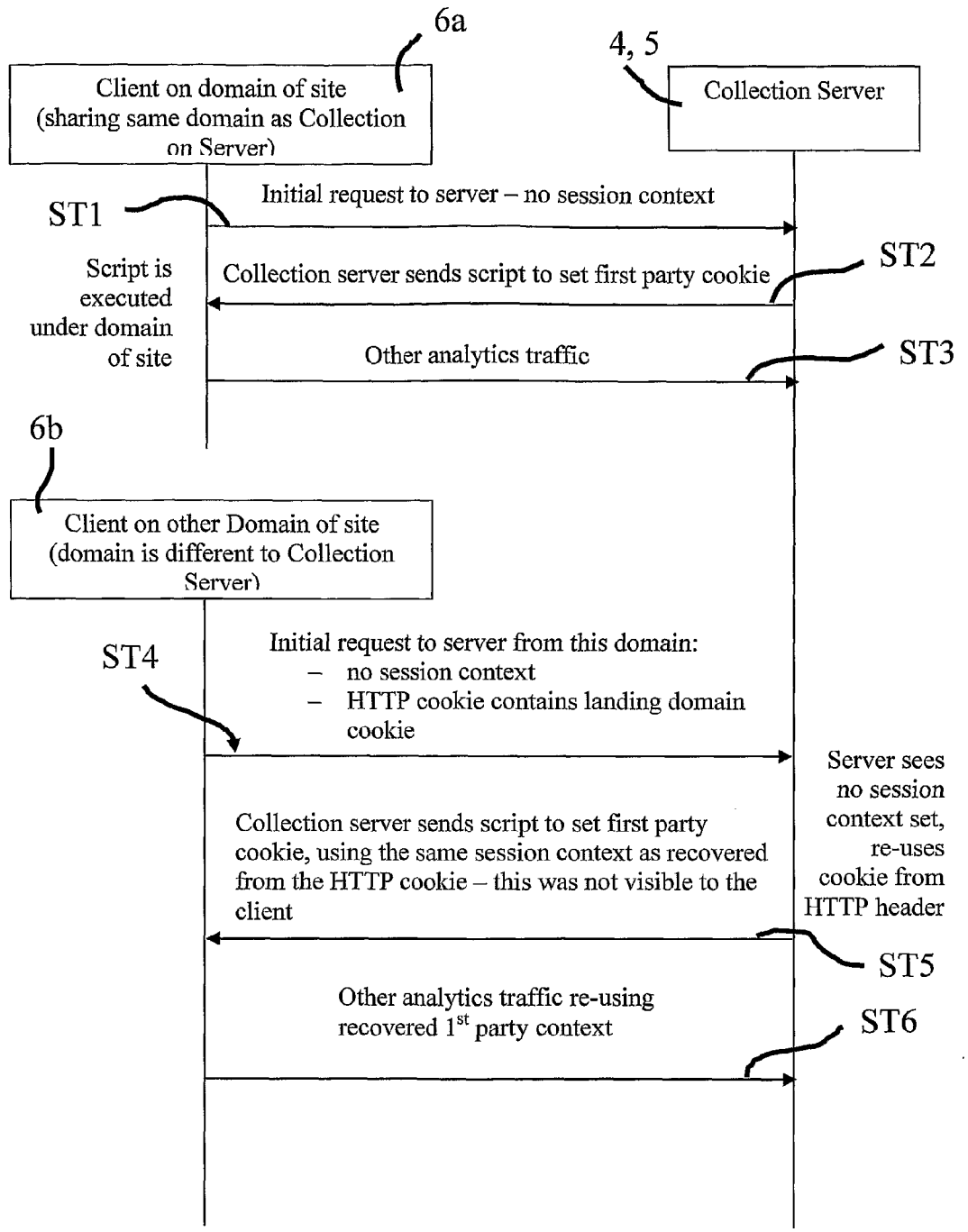
FIG. 2 schematically shows a sequence diagram of client/server interactions in the operation of part of the website monitoring system.

FIG. 2 is a sequence diagram showing the client/server interactions which take place as the user uses the client device 6 to first of all visit a web site provided on the first web server 1 and hence in the same domain as the collection server 4 and then subsequently visits a web site in a different domain, provided on say, the second web server 2.

Referring now to FIG. 2 the first stage in this process occurs with the client device 6 having a page 8 from the first web server 1 loaded into its browser 7. In FIG. 2 the client in this situation is indicated by reference numeral 6a.

The page 8 contains appropriate code such that an initial request for a page component can be sent to the collection server 4 and communication with the collection server facilitated. This code may comprise an "include" statement. The page 8 includes this code because it has been "client side tagged" in the way which is now conventionally used when monitoring the performance of websites.

Whilst this client side tagging technique and the monitoring process itself are not described in detail in the current specification, it will be appreciated both that these techniques in themselves are conventional.

It is also important to note, however, that in the present embodiment the page 8 must be set up appropriately to generate messages, receive messages and process these accordingly. This means that the monitoring process used is self-contained in that the web pages to be monitored must be written to facilitate this monitoring. This means that if a user navigates to a page which is not appropriately set up, no monitoring will occur. This means that the current technique can be used in a way where there is no risk to the user that all of his or her activities will be monitored. This makes the current techniques more practical as they are acceptable.

Returning now to the detail of the process, in step ST1, the page 8 sends an initial http request for a page component to the collection server 4. At this point there is no session context. In response to this request the collection server 4, in particular the cookie control server 5, sends in step ST2 script to the page 8 which includes an instruction to set a first party cookie within the browser 7. This script is then executed by the page 8. Because this processing occurs in the page, it occurs under the domain of the site being monitored and this allows the setting of a first party cookie. Once this first party cookie is in place, then as monitoring (or analytics) traffic is sent back to the collection server 4 in step ST3 from the original page 8 or other pages 8 which are appropriately set up, information contained in the first party cookie for that domain will be included in the messages to the collection server 4. In particular each such message may include a session ID to allow all of the monitored activities of the user in that browser session, whilst in the original domain, to be tied together.

At some point the user may leave the original domain and browse to other web sites such that a page 8 running within the browser 7 is from a different domain. In this example, we shall assume that the user has navigated to a page 8 supplied by the second web server 2 and hence is now in the domain 123.co.uk whereas the collection server is in the domain 123.com. The client device in this situation is referenced by reference numeral 6b in FIG. 2. Again assuming the page 8 loaded from the second web server 2 is appropriately set up and includes code that requests a page component from the collection server 4, then in step ST4 an initial http request will be sent from the page 8 to the collection server 4. At this point in time there will be no session context, but due to the way in which http messages are arranged to function, the header of the http request generated by the page 8 in ST4 will include in it the first party cookie for the 123.com domain set as a result of step ST1 and ST2. This is because the http request is being sent to the collection server 4 which is in the appropriate domain for the 123.com first party cookie. This means that although the browser 7 at that point on the client device 6b cannot see the first party cookie because the browser itself is operating in another domain, i.e. 123.co.uk rather than 123.com, the collection server 4 can see this 123.com first party cookie.

At this stage the collection server 4 can make use of the cookie in the http header. In the current embodiment the collection server 4 (in particular the cookie control server 5) first determines if there is a session context in respect of this (123.co.uk) domain and only uses the cookie from http header if there is no such context. At this stage in the present example there is no such context because this browser instance has not visited the 123.co.uk domain previously. (In this embodiment if there were already an appropriate first party cookie for the 123.co.uk domain that would be used to set the session ID).

Therefore the cookie from the http header is used and in step ST5 the collection server 4 sends script to the page 8 in the user device 6 to generate a first party cookie in the browser 7 which uses the same session context as recovered from the cookie in the http header received in step ST4. Once this cookie has been set in the browser 7 then again other analytics traffic may be sent to the collection server 4 in step ST6 making use of the same session ID as recovered from the original first party cookie. Thus session continuity can be maintained.

In an alternative to the above approach after step ST4, the contents of the http cookie could be considered first before looking to see if there is any session context within the new domain (i.e. 123.co.uk). This could be advantageous because it would ensure that the information gathered in the partial session above indicated at step ST3 would be tied together with the partial session which is about to start in the 123.co.uk domain even if the 123.co.uk domain had been visited before. Otherwise the new partial session in the 123.co.uk domain would be tied with any partial session which had taken place with respect to domain 123.co.uk before the partial session of in domain 123.com had occurred. It might also be possible to in fact link all three of such partial sessions together by appropriate tying of the different session IDs.

If after the set of interactions shown in FIG. 2, the user were to navigate to a page from the third web server 3, then assuming that that page was appropriately set up, the above process could repeat again. Again, as a page from the third web server 3 requested a page component, i.e. script from the collection server 4, this http request would be accompanied by the original first party cookie for the 123.com domain and the session context could be extracted from this by the collection server 4 and returned to the page in the user device 6 such that a new first party cookie for that domain, i.e. the 123.eu domain could be generated in the page and set.

It should be noted that there is no requirement for the collection server 4, cookie control server 5, and first web server 1 to be physically located in the same place. All that is required is that they are within the same domain. Thus, the collection server 4 and cookie control server 5 may be hosted elsewhere and might have an address such as "collect.123.com". This would be indicative of the collection server and cookie control server 4,5 being hosted somewhere different, but still being within the same 123.com domain.

In a practical set up, an enterprise having a portal website in one domain would have the corresponding collection server 4 and cookie control server 5 set up in that domain. The idea here would be that a user would first visit the portal website and hence visit the domain of the collection server 4 first of all and then might navigate away to websites of the enterprise which were in a different domain. Yet with the present techniques, the enterprise would still be able to gather monitoring information concerning a user's interactions with both the initial portal website and website subsequently visited.

If the portal site is not the first to be visited, then in general terms the session continuity could start from the point at which the portal site was visited.

It will be appreciated that the invention is not restricted to use with enterprises having a portal site as any domain could be chosen to be what might be considered to be the master domain, i.e. the domain in which the collection server/cookie control server 4,5 resides.

In some instances, it may be necessary for the websites to be monitored to implement a security policy such as P3P to give successful operation.

Figure 3:
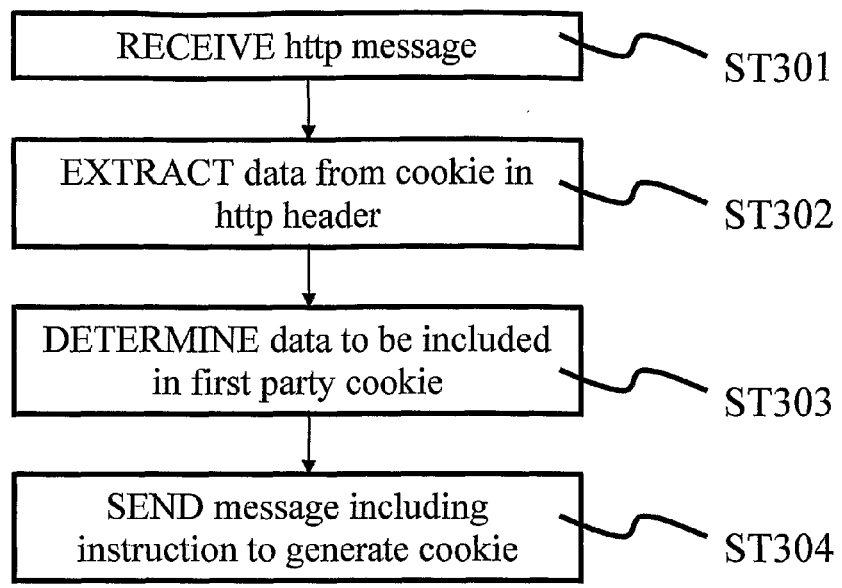
FIG. 3 is a flow chart showing the process carried out at a cookie control server of the website monitoring system.

FIG. 3 shows a flow chart showing the process carried out at the collection server 4 (in particular the cookie control server 5) when carrying out what could be termed as a cookie recovery part of the above process. In a first step ST301 an http message is received from a page 8. In a second step ST302 data from the first party cookie in the http header is extracted. In a third step ST303 the cookie control server 5 determines what data should be included in a first party cookie to be generated in the page 8 that sent the original http message in step ST301. In a fourth step ST304 the cookie control server 5 sends a message back to the originating page 8 including an instruction to generate a cookie including the required data.

In the embodiment described above, this process is used to extract a session ID from the first party cookie and to send an instruction to the page 8 to generate a cookie including the same session ID.

It will be appreciated, however, that this same process may be used in different ways. At the most basic level rather than extracting a session ID and reassigning the same session ID for the first party cookie to be generated, the cookie control server may rather determine that a modified session ID should be included in the cookie to be generated. Provided that the modified session ID can be tied together with an initial session ID this of course allows session continuity to be maintained.

A broader range of alternatives exist. Any data which is present in the first party cookie may be extracted and almost anything may be done with it. Similarly, the message sent back to the page may include an instruction to do almost anything. Thus, for example if the first party cookie includes a customer ID, log-in details or a password and so on, then this could be in at least some circumstances extracted and processed and fed back to the page sending the http message in step ST301.

This means, for example, that if a user is navigating through pages in one domain having had to log on to the appropriate website and then moves across to another domain, a secure user session may be seamlessly created for that user in the website on the new domain by virtue of the log-in details being extracted from the initial first party cookie in step ST302 and used to send a message in step ST304 to generate an appropriate first party cookie for the new domain.

Figure 4:
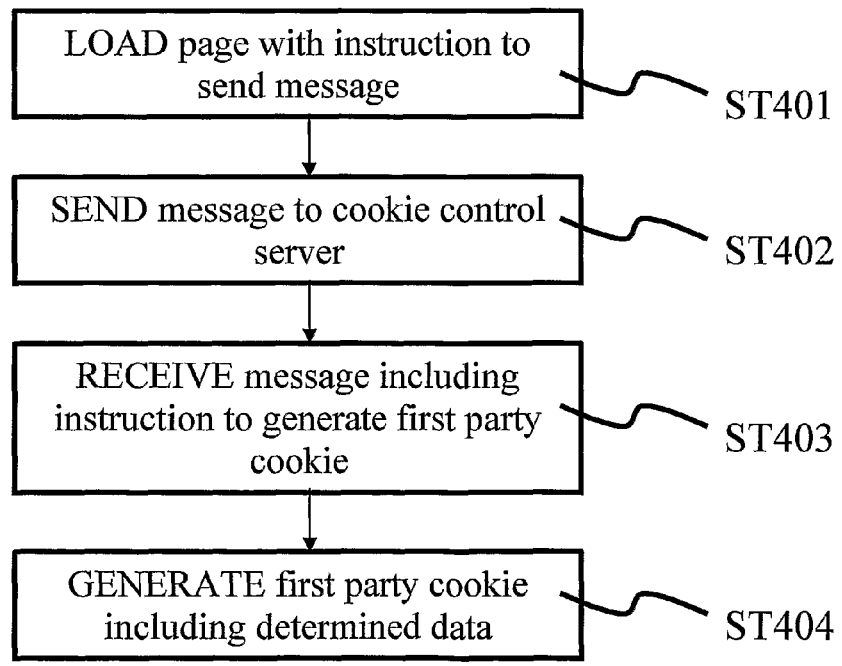
FIG. 4 shows a flow chart showing the process carried out at a client device when interacting with the cookie control server.

FIG. 4 shows a flow chart showing the cookie generation process from the client device 6 end. In a first step ST401 a page including an instruction to send an http message (i.e. a request for a page component, in particular, a piece of script) is loaded. In a second step ST402, the page 8 within the browser 7 on the client device 6 sends a message to the cookie control server 5. In a third step ST403 the page 8 receives back a message including an instruction to generate a first party cookie and in a fourth step ST404 the page generates the appropriate first party cookie. Of course, this first party cookie includes the data which it was determined it should include at the cookie control server 5.

Whilst the above description has been written in terms of a conventional PC running a conventional browser it will be appreciated that in alternatives the client device 6 may be differently constituted. In particular the client device might comprise a mobile telephone or other such device and might comprise an embedded browser.

In a development of the above embodiment a set of cookie control servers may be provided with one in each relevant domain to be monitored. The set of cookie control servers can be organised to synchronise their activities to allow the tracking of visitors (users) across domains. This would allow tracking of interactions with a whole group of sites in different domains (having appropriately linked cookie control servers) irrespective of which domain the user first visited.

The present invention may be embodied in one or more computer programs carried by machine readable media, for example, a signal, a CD-Rom, a flash memory device, a hard disk or so on, such programs being arranged to cause a server, client device or other computer (in the broadest sense) to operate as described above. Similarly the invention may be embodied in apparatus comprising a computer (in the broadest sense) set-up under the control of such programs to operate as described above.

What is claimed is:

1. A method for setting a second domain first party cookie in a second domain on a client device including data extracted from a first domain first party cookie in a first domain comprising the steps of:

receiving at a server in the first domain, an http message from an active page, in the second domain, within a browser running on the client device;

extracting data from the first domain first party cookie, present in the header of the http message;

determining data which is to be included in the second domain first party cookie, resident on the client device in dependence on the data extracted from the first domain first party cookie, present in the header of the http message; and sending a message to the active page in the second domain including an instruction comprising added computer instruction code executable by the browser which, when executed, generates the second domain first party cookie within the browser, including the data determined in the determining step.

2. A method according to claim 1, wherein the step of extracting data from the first domain first party cookie present in the header of the http message comprises the step of extracting a session ID from the first domain first party cookie.

3. A method according to claim 1, wherein the message sent to the active page includes an instruction to generate the second domain first party cookie including a session ID determined in dependence on the extracted session ID.

4. A method according to claim 1, comprising the further step of receiving further http messages from at least one of the same page and another page within the browser that include data derived from the second domain first party cookie.

5. A method according to claim 4, wherein the further messages include a session ID derived from the second domain first party cookie.

6. A method according to claim 4, wherein the data derived from the second domain first party cookie comprises the second domain first party cookie itself.

7. A method according to claim 1, comprising the further step of the server receiving a plurality of http messages and determining whether the http messages are from the same browser session in dependence on the data, derived from the second domain first party cookie, present in each http message.

8. A method according to claim 1, comprising the further step of the server receiving a plurality of http messages and determining whether the http messages are from the same browser session in dependence on session IDs present in each http message.

9. A method according to claim 1, comprising the step of receiving monitoring information concerning at least one of webpage interactions and performance from the browser running on the client device.

10. A method according to claim 9, wherein there is a collection server for collecting the monitoring information concerning at least one of website interactions and performance.

11. A method according to claim 10, wherein the server comprises the collection server.

12. A method according to claim 1, wherein the http message from the active page comprises a request for a page component.

13. A method according to claim 1, wherein the message to the active page comprises a portion of script arranged to execute within the page to generate the second domain first party cookie including the data determined in the determining step.

14. An apparatus for causing setting of a second domain first party cookie in a second domain on a client device including data extracted from a first domain first party cookie in a first domain, the apparatus comprising a server including at least one computer, in the first domain, arranged under the control of software to:
   receive an http message from an active page, in the second domain, within a browser running on the client device;
   extract data from the first domain first party cookie, present in the header of the http message;
   determine data which is to be included in the second domain first party cookie, resident on the client device in dependence on the data extracted from the first domain first party cookie, present in the header of the http message; and
   send a message to the active page in the second domain including an instruction comprising added computer instruction code executable by the browser which, when executed, generates the second domain first party cookie within the browser, including the data determined in the determining step.

15. An apparatus for causing setting of a second domain first party cookie in a second domain on a client device including data extracted from a first domain first party cookie in a first domain, the apparatus comprising a server including at least one computer in the first domain having:
   a receive module for receiving an http message from an active page, in the second domain, within a browser running on the client device;
   an extract module for extracting data from the first domain first party cookie, present in the header of the http message;
   a determination module for determining data which is to be included in the second domain first party cookie, resident on the client device in dependence on the data extracted from the first party cookie, present in the header of the http message; and
   a send module for sending a message to the active page in the second domain including an instruction comprising added computer instruction code executable by the browser which, when executed, generates the second domain first party cookie within the browser, including the data determined in the determining step.

16. A website monitoring method comprising the steps of:
   receiving at a server, in a first domain, an http message from an active page, in a second domain, within a browser running on a client device;
   extracting data from a first domain first party cookie, present in the header of the http message;
   determining data which is to be included in a second domain first party cookie, resident on the client device in dependence on the data extracted from the first domain first party cookie, present in the header of the http message;
   sending a message to the active page in the second domain including an instruction comprising added computer instruction code executable by the browser which, when executed, generates the second domain first party cookie, within the browser including the data determined in the determining step; and
   receiving at one of the server and a separate collection server, from the browser running on the client device, messages including data derived from the second domain first party cookie and information concerning at least one of: interactions with and performance of at least one page browsed within the browser running on the client device.

17. A website monitoring system comprising:
a) a server including at least one computer, in a first domain, arranged under the control of software to:
   receive an http message from an active page, in a second domain, within a browser running on a client device;
   extract data from a first domain first party cookie, present in the header of the http message;
   determine data which is to be included in a second domain first party cookie, resident on the client device in dependence on the data extracted from the first domain first party cookie, present in the header of the http message; and
   send a message to the active page in the second domain including an instruction comprising added computer instruction code executable by the browser which, when executed, generates the second domain first party cookie, within the browser including the data determined in the determining step; and
b) a collection server including at least one computer arranged under the control of software to:
   receive, from the browser running on the client device, messages including data derived from the second domain first party cookie and information concerning at least one of: interactions with and performance of at least one page browsed within the browser running on the client device; and
   determine whether received messages are from the same browser session in dependence on the data derived from the second domain first party cookie present in each message.

18. A website monitoring system comprising:
a) a server including at least one computer, in a first domain, comprising:
   a receive module for receiving an http message from an active page, in a second domain, within a browser running on a client device;

an extract module for extracting data from a first domain first party cookie, present in the header of the http message;

a determination module for determining data which is to be included in a second domain first party cookie, resident on the client device in dependence on the data extracted from the first domain first party cookie, present in the header of the http message; and a send module for sending a message to the active page in the second domain including an instruction comprising added computer instruction code executable by the browser which, when executed, generates the second domain first party cookie within the browser, including the data determined in the determining step; and b) a collection server including at least one computer and comprising:

a receive module for receiving, from the browser running on the client device, messages including data derived from the second domain first party cookie and information concerning at least one of: interactions with and performance of at least one page browsed within the browser running on the client device; and a determination module for determining whether received messages are from the same browser session in dependence on the data derived from the second domain first party cookie present in each message.

19. A website monitoring system according to claim 18, wherein said server defined in a) comprises the collection server defined in b).

20. A method for setting a second domain first party cookie in a second domain on a client device including data extracted from a first domain first party cookie in a first domain comprising the steps of:

sending from an active page, in the second domain, within a browser running on the client device, to a server, in the first domain, an http message, having a header including the first domain first party cookie;

receiving a message in the active page from the server, the message including an instruction comprising added computer instruction code executable by the browser which, when executed, generates the second domain first party cookie, within the browser including data determined by the server in dependence on data extracted from the first domain first party cookie, in the header of the http message sent to the server; and generating within the browser running on the client device the second domain first party cookie, in response to the received instruction.

21. A client device including at least one computer arranged under the control of software to:

send from an active page, in a second domain, within a browser running on the client device, to a server in a first domain, an http message, having a header including a first domain first party cookie;

receive a message in the active page from the server, the message including an instruction comprising added computer instruction code executable by the browser which, when executed, generates a second domain first party cookie, within the browser including data determined by the server in dependence on data extracted from the first domain first party cookie, in the header of the http message sent to the server; and generate within the browser running on the client device the second domain first party cookie, in response to the received instruction.

22. A computer program product comprising a non-transitory machine-readable data carrier containing a program comprising code portions which, when loaded and run on at least one computer, cause the at least one computer to carry out the methods claimed in claim 1.

23. A computer program product comprising a non-transitory machine-readable data carrier containing a program comprising code portions which, when loaded and run on a computer, cause the computer to comprise the apparatus claimed in claim 14.

* * * * *